(12) United States Patent
Scarborough

(10) Patent No.: US 11,343,336 B1
(45) Date of Patent: May 24, 2022

(54) AUTOMATICALLY SYNDICATING LICENSED THIRD-PARTY CONTENT ACROSS ENTERPRISE WEBPAGES

(71) Applicant: Dell Products L.P., Round Rock, TX (US)

(72) Inventor: Kyle Alan Scarborough, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/506,828

(22) Filed: Oct. 21, 2021

(51) Int. Cl.
| | |
|---|---|
| G06F 15/167 | (2006.01) |
| H04L 67/53 | (2022.01) |
| H04L 67/75 | (2022.01) |
| H04L 67/06 | (2022.01) |
| G06Q 30/02 | (2012.01) |
| G06F 21/10 | (2013.01) |
| H04L 67/02 | (2022.01) |

(52) U.S. Cl.
CPC ............ *H04L 67/20* (2013.01); *G06F 21/10* (2013.01); *G06Q 30/0282* (2013.01); *H04L 67/02* (2013.01); *H04L 67/06* (2013.01); *H04L 67/36* (2013.01); *G06F 2221/0786* (2013.01)

(58) Field of Classification Search
None
See application file for complete search history.

(56) References Cited

U.S. PATENT DOCUMENTS

| | | | |
|---|---|---|---|
| 2010/0180349 A1* | 7/2010 | Koohgoli | G06F 21/10 726/30 |
| 2011/0225658 A1* | 9/2011 | Khosravy | H04L 47/70 726/28 |
| 2015/0212673 A1* | 7/2015 | Geraghty | G06F 3/0484 715/730 |
| 2015/0235036 A1* | 8/2015 | Cowan | G06F 11/3006 726/30 |
| 2017/0078718 A1* | 3/2017 | Ioffe | H04N 21/23418 |
| 2017/0287089 A1 | 10/2017 | Ishida | |
| 2019/0132629 A1* | 5/2019 | Kendrick | G06F 16/9017 |
| 2019/0259107 A1* | 8/2019 | Hollis | H04L 65/403 |
| 2019/0108556 A1 | 11/2019 | Maher et al. | |
| 2020/0134678 A1 | 4/2020 | Langston et al. | |
| 2020/0372546 A1 | 11/2020 | Maher et al. | |

\* cited by examiner

*Primary Examiner* — Quang N Nguyen
(74) *Attorney, Agent, or Firm* — Ryan, Mason & Lewis, LLP

(57) ABSTRACT

Methods, apparatus, and processor-readable storage media for automatically syndicating licensed third-party content across enterprise webpages are provided herein. An example computer-implemented method includes generating, in connection with licensed third-party content, one or more licensed third-party content syndication files comprising a set of fields related to enterprise product information, licensed third-party content format information, license-related governance information, and enterprise webpage-based distribution information; processing at least a portion of the licensed third-party content using the one or more licensed third-party content syndication files; and automatically syndicating the at least a portion of the licensed third-party content, in accordance with the processing, across multiple user interfaces associated with one or more enterprise webpages, using at least one application programming interface.

20 Claims, 6 Drawing Sheets

AUTOMATICALLY SYNDICATING LICENSED THIRD-PARTY CONTENT ACROSS ENTERPRISE WEBPAGES

FIELD

The field relates generally to information processing systems, and more particularly to techniques for managing distribution of data in such systems.

BACKGROUND

Companies and other enterprises commonly license usage rights to promote awards and product review content across available product categories and lines of business. The use of such third-party product reviews and awards typically aims to promote confidence in products and brands while helping customers to make informed purchasing decisions. This type of third-party content, as noted, typically requires usage rights, procured through license agreements with the licensors or original publishers of the copyrighted content, and the governance of the usage of such content presents a number of challenges.

However, conventional content management approaches commonly result in operational and design-related problems. For example, different enterprise websites and product areas of such websites are commonly hosted from multiple applications and/or platforms with different technical capabilities, requiring resource-intensive and error-prone individual processes for managing and publishing of third-party content.

SUMMARY

Illustrative embodiments of the disclosure provide techniques for automatically syndicating licensed third-party content across enterprise webpages. An exemplary computer-implemented method includes generating, in connection with licensed third-party content, one or more licensed third-party content syndication files comprising a set of fields related to enterprise product information, licensed third-party content format information, license-related governance information, and enterprise webpage-based distribution information. Additionally, the method includes processing at least a portion of the licensed third-party content using the one or more licensed third-party content syndication files, and automatically syndicating the at least a portion of the licensed third-party content, in accordance with the processing, across multiple user interfaces associated with one or more enterprise webpages, using at least one application programming interface.

Illustrative embodiments can provide significant advantages relative to conventional content management approaches. For example, problems associated with resource-intensive and error-prone individual processes for managing and publishing varied third-party content are overcome in one or more embodiments through automatically syndicating licensed third-party content across enterprise webpages through the use of dynamic content syndication files.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
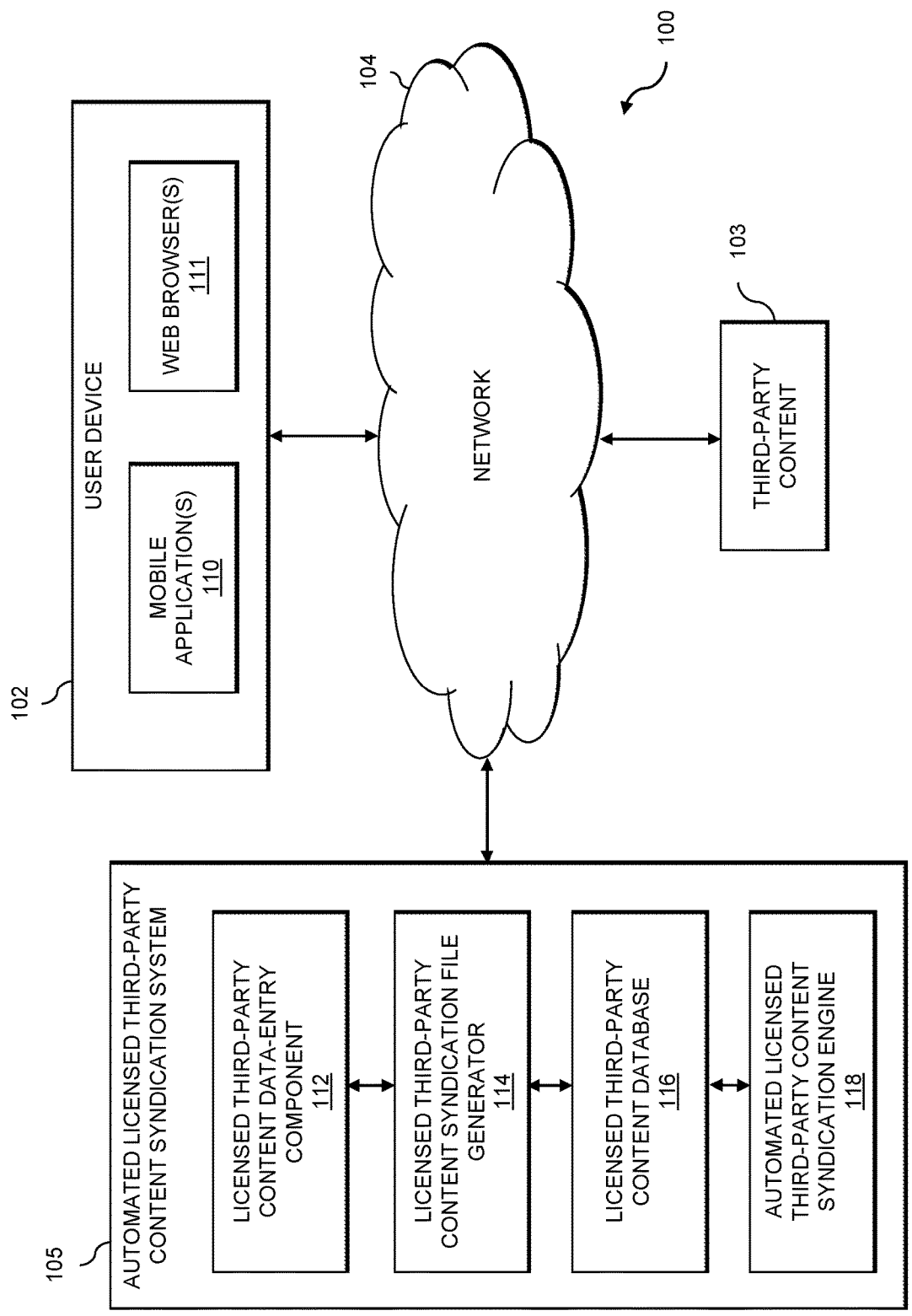
FIG. 1 shows an information processing system configured for automatically syndicating licensed third-party content across enterprise webpages in an illustrative embodiment.

FIG. 1 shows a computer network (also referred to herein as an information processing system) 100 configured in accordance with an illustrative embodiment. The computer network 100 comprises user device 102, which includes one or more mobile applications 110 (for example, enterprise-related web applications, electronic commerce web applications, etc.) and one or more web browsers 111. The user device 102 is coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated licensed third-party content syndication system 105 and a collection and/or source of third-party content 103 (e.g., industry expert product reviews, related videos, etc.).

The user device 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user device 102 in some embodiments comprises a computer associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Automated licensed third-party content syndication system 105 in the FIG. 1 embodiment is assumed to be implemented using at least one processing device. Each such processing device generally comprises at least one processor and an associated memory, and implements one or more functional modules for controlling certain features of automated licensed third-party content syndication system 105.

More particularly, automated licensed third-party content syndication system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated licensed third-party content syndication system 105 to communicate over the network 104 with user device 102, and illustratively comprises one or more conventional transceivers.

The automated licensed third-party content syndication system 105 further comprises licensed third-party content data-entry component 112, licensed third-party content syndication file generator 114, licensed third-party content database 116, and automated licensed third-party content syndication engine 118.

Licensed third-party content database 116 is configured to store, for example, custom third-party content files (e.g., awards and reviews files) generated in connection with the syndication techniques detailed herein (e.g., generated by licensed third-party content syndication file generator 114), third-party licensor information, licensing provision information, product information, etc.

The licensed third-party content database 116 in the present embodiment is implemented using one or more storage systems associated with automated licensed third-party content syndication system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

It is to be appreciated that this particular arrangement of elements 112, 114, 116 and 118 illustrated in the automated licensed third-party content syndication system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

Additionally, associated with automated licensed third-party content syndication system 105 are one or more input-output devices, which illustratively comprise keyboards, displays or other types of input-output devices in any combination. Such input-output devices can be used, for example, to support one or more user interfaces to automated licensed third-party content syndication system 105, as well as to support communication between automated licensed third-party content syndication system 105 and other related systems and devices not explicitly shown.

It is to be understood that the particular set of elements shown in FIG. 1 for automatically syndicating licensed third-party content across enterprise webpages involving at least one user device 102 of computer network 100 is presented by way of illustrative example only, and in other embodiments additional or alternative elements may be used. Thus, another embodiment includes additional or alternative systems, devices and other network entities, as well as different arrangements of modules and other components.

In one or more such embodiments, all elements and processes contained within and/or associated with automated licensed third-party content syndication system 105 are implemented within a secured (e.g., permissions-controlled and/or access-controlled) environment to maintain compliance with the accuracy of the content and/or data required in accordance with one or more license-related agreements. For example, with respect to the illustrative embodiment depicted in FIG. 1, such a secure environment ensures usage rights to third-party content 103 to be entered via licensed third-party content data-entry component 112 and prevented from alteration via elements 114, 116 and/or 118.

An exemplary process utilizing elements 112, 114, 116 and 118 of an example automated licensed third-party content syndication system 105 in computer network 100 will be described in more detail with reference to the flow diagram of FIG. 4.

Accordingly, at least one embodiment includes automatically providing data syndication and governance for online content using a content management system in computing environments. Specifically, as further detailed herein, one or more embodiments include creating multiple different user interfaces (UIs) in at least one web application (according to an established user experience (UX) governance model in the design of various UXs) utilizing a single awards file within a database to populate the data for each UI. Additionally, such online content data can be stored, for example, as one or more custom awards and reviews files within a content management system.

Also, as further detailed below, one or more embodiments includes securing data (e.g., as transmitted between automated licensed third-party content syndication engine 118 and user device 102). In one or more embodiments, data syndication of such files are automated through the use of one or more custom APIs. The syndicated data can be hygienic (i.e., the data are free from risk of exposure to any corruption and/or modification between the back-end syndication system and the front-end UX) according to one or more specified requirements of licensing agreements with licensors of third-party content. Such data can allow, for example, for public-facing display of licensed third-party video, imagery, logos, text (e.g., pull-quotes, headlines, etc.) and hyperlinks to original third-party content sources, from licensee's paid or owned web properties. In at least one embodiment, each content file contains metadata to govern the appropriate distribution of the content across various websites, user experiences and layers of a customer's web session (e.g., shopping path) in the appropriate locales and markets, as well as schema for search engine optimization (SEO).

As used herein, third-party licensed content refers to any copyrighted content owned by a third-party that must be licensed in accordance with a license agreement for usage rights to repurpose the content for promotion (e.g., in enterprise marketing and/or advertising vehicles). Also as used herein, "awards and reviews" refers to a custom content and/or file type that includes specific data fields for entering and storing public-facing web content (including, but not limited to, copy, hyperlinks, imagery, publication dates, etc.) that meet requirements prescribed by third-party licensors, SEO schema, and system data. Further, in one or more embodiments, awards and reviews can be used as a single data source feeding multiple UXs through API syndication. Additionally, as used herein, publication date refers to the original publication date of third-party content by the original publisher (e.g., on the original publisher's website). Further, as used herein, syndicating is to be broadly construed to refer to distributing content derived from at least one given source to one or more varied outlets (e.g., websites, user experiences, etc.) in a governed manner.

As further described herein, one or more embodiments include generating and/or implementing at least one custom awards and reviews content file type and custom website collection in connection with at least one web content publishing platform. In such an embodiment, at least one custom API is used to feed awards and reviews data directly to front-end web pages of a given enterprise. Such a modular approach expands compatibility with a limitless number of different user experiences, plugging into unique user interfaces across any site layer in online explore, discover, shop and purchase experiences on a global basis.

Additionally, one or more embodiments include providing dynamic management and syndication of multiple content formats (e.g., product review videos, awards and/or review logos, pull-quotes, etc.) from a single content type, automated data syndication to multiple customer segments, regions, countries, and languages, bulk syndication across multiple page and/or product variants from a single data source, decoupling of data and content setup and/or implementation (which, for example, allows for syndication to multiple user experiences from a single data source), cross-platform and/or cross-site syndication capability, and scalability for future expansion and/or use of data.

Figure 2:
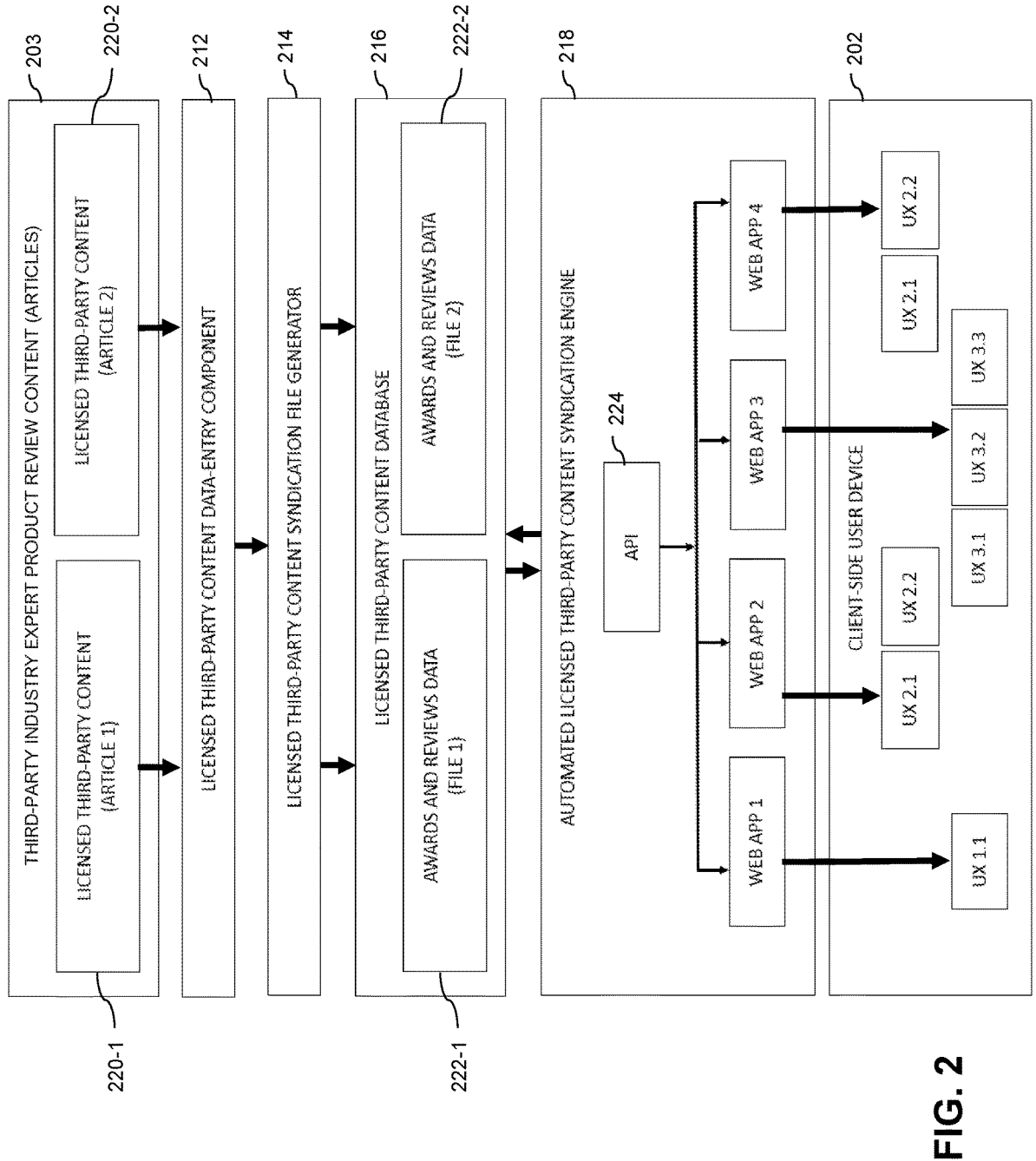
FIG. 2 shows an example workflow of licensed third-party content syndication in an illustrative embodiment.

FIG. 2 shows an example workflow of licensed third-party content syndication in an illustrative embodiment. As is to be appreciated by one skilled in the art, FIG. 2 depicts two articles (i.e., 220-1 and 220-2) merely as an example of multiple pieces of content from a variety of third-party content sources, but one or more embodiments can include the use of less than or more than two articles and/or content sources at a given time and/or iteration.

By way merely of illustration, FIG. 2 depicts third-party content 203 (e.g., industry expert reviews of and/or awards for one or more enterprise products and/or services) which includes a first article 220-1 and a second article 220-2. Article 220-1 and article 220-2 are entered into and/or obtained via licensed third-party content data-entry component 212, which then provides at least a portion of such content to licensed third-party content syndication file generator 214. As detailed herein, licensed third-party content syndication file generator 214 processes the provided content, generates awards and reviews data (e.g., a first file 222-1 and a second file 222-2, corresponding to article 220-1 and article 220-2, respectively), and provides and/or stores such data in licensed third-party content database 216. For example, relevant public-facing third-party content (e.g., copy, hyperlinks, image files and/or video metadata) can be processed by licensed third-party content syndication file generator 214 as part of the awards and reviews data generation.

As also depicted in FIG. 2, automated licensed third-party content syndication engine 218 interacts with licensed third-party content database 216, processing at least a portion of the awards and reviews data (i.e., file 222-1 and/or file 222-2). Further, automated licensed third-party content syndication engine 218 includes API 224 and multiple web applications (e.g., web apps 1-4 in the FIG. 2 example), which are used and/or implemented to syndicate portions of the awards and reviews data to client-side user device 202 via multiple distinct UXs. Accordingly, in connection with the publishing at least portions of the awards and reviews data (e.g., files 222-1 and 222-2), at least a portion of such data is syndicated to one or more appropriate UXs on the client-side user device 202, with such syndication being based at least in part on relevant product model(s), locale variant(s), etc. (e.g., using identifiers and/or taxonomies tagged for syndication), as called by API 224 embedded in connection with the various web applications associated with automated licensed third-party content syndication engine 218.

In at least one embodiment associated with the example depicted in FIG. 2, web page-level syndication can be carried out by deploying one or more UIs implemented to display the corresponding content in a designated area of a web page and/or within an existing UX. In such a scenario as depicted in FIG. 2, for example, awards and reviews data (e.g., files 222-1 and 222-2) can be routed to the appropriate UX in connection with user device 202 via API 224, based upon existing identifier values tied specifically to individual web applications and/or web pages and in common with content tagging for one or more specific product identifiers, one or more franchise identifiers, and/or one or more additional taxonomy identifiers applied to the content files (i.e., files 222-1 and 222-2). No additional user configurations are necessary. By way of further explanation, with respect to the above-noted "franchise identifiers" and "additional taxonomy identifiers," one or more identifiers can be used to associate files with appropriate pages or UXs, wherein such identifiers can be any relevant value as pertaining to any particular enterprise (e.g., there can be specific strings such as "product ID" which is used to associate files to different pages on an enterprise website, whereas such strings can vary from enterprise to enterprise or application to application).

Additionally or alternatively, web part syndication can be carried out as a variation on the method of direct syndication to a designated web page zone and/or UX within a webpage template. As used herein, a "web part" refers to a query-based authoring module which can be used to manually configure and/or specify parameters to call for (e.g., to return specific awards data based upon common values between the awards file and the configured matching values within the authoring module). In connection with web part syndication, data may be called via API by setting appropriate identifier value(s), within a backend authoring module, as a standalone web part. In one or more embodiments, an interim user action to configure the web part can be required in this scenario before any data is syndicated through the API.

In accordance with at least one embodiment, a unique menu of values may be created and utilized to syndicate awards and reviews data for web part implementation. Data entry fields associated with such values can include, for example, a control field for dynamic fields, customer-facing content fields for awards and reviews, customer-facing content fields for video reviews, metadata fields for publishing content (e.g., awards, reviews and video reviews), fields for SEO schema (pertaining to awards, reviews and video reviews), etc. One or more additional fields may be added and/or one or more fields may be removed and/or modified as necessary to accommodate additional and/or different implementations.

More specifically, a control field for dynamic fields can include a selection and/or identification of content format (e.g., selected from a list such as ['Awards and Reviews' or 'Video Review']). Customer-facing content fields for awards and reviews can include selection and/or identification of a logo image (e.g., a logo image for the enterprise licensing the third-party content), as well as selection and/or identification of alternative copy for the logo image (e.g., a text field for identifying the enterprise and/or a pull-quote from a portion of the licensed third-party content). Customer-facing content fields for awards and reviews can also include a headline, which includes a text field for a brief summary of and/or highlight from the licensed third-party content, and a sub-headline and/or pull-quote, which includes a text field for a secondary point and/or highlight from the licensed third-party content. Additionally, customer-facing content fields for awards and reviews can include publisher attribution information, which includes a text field for identifying the original publisher (i.e., the licensor of the third-party content), and a publication date, which includes a date field, as well as, optionally, a display publication date, which includes a checkbox (No or Yes) pertaining to content display. Further, customer-facing content fields for awards and reviews can also include at least one disclaimer, which includes a text field (for text such as, for example, "reprinted with permission," copyright information, etc.), and at least one review hyperlink, which includes at least one third-party uniform resource locator (URL) related to the licensed content.

Similar to customer-facing content fields for awards and reviews, customer-facing content fields for video reviews can include a headline, publisher attribution information, a publication date, at least one disclaimer, and/or information pertaining to video duration (which includes a time and/or text field.

Additionally, metadata fields for publishing can include locale and/or profile information, which includes a multi-selection list (for example, from a web content management system and/or content publishing platform) identifying particular regions, countries, markets, etc. applicable to the licensed third-party content. Metadata fields for publishing can also include segment information, which includes a multi-selection list (for example, from a web content management system and/or content publishing platform) identifying particular product and/or market segments related to the licensed third-party content, as well as product variant lookup information, which includes a multi-selection list (for example, from a web content management system and/or content publishing platform) identifying particular relevant product variants corresponding to the product(s) at issue in the licensed third-party content. Further, metadata fields for publishing can also include product category information, which includes a single selection list (for example, from a web content management system and/or content publishing platform) identifying various product categories relevant to the licensed third-party content.

Also, fields for SEO schema (e.g., related to awards and reviews, as well as video reviews) can include expert content type information, which includes a checkbox and/or radio-button identifying 'Award' or 'Review', as well as review rating information, which includes a text field, and/or identification of the author of the licensed third-party content, which includes a text field.

Figure 3:
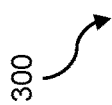
FIG. 3 shows an example code snippet for an application programming interface (API) request and/or response schema, as part of a syndication engine, for publishing licensed third-party content to one or more appropriate websites and/or web pages in an illustrative embodiment.

FIG. 3 shows an example code snippet for an API request and/or response schema, as part of a syndication engine, for publishing licensed third-party content to one or more appropriate websites and/or web pages in an illustrative embodiment. Specifically, the example code snippet 300 depicted in FIG. 3 is a detailed example of API 224 from the FIG. 2 embodiment. In this embodiment, example code snippet 300 is executed by or under the control of at least one processing system and/or device. For example, the example code snippet 300 may be viewed as comprising a portion of a software implementation of at least part of automated licensed third-party content syndication system 105 (e.g., automated licensed third-party content syndication engine 118) of the FIG. 1 embodiment.

The example code snippet 300 illustrates an example API built for a given content management system (e.g., wherein it is to be appreciated that such an API can vary per content management system, per web application, and/or per enterprise). More specifically, example code snippet 300 depicts an example return response to a call for data, based primarily on identifier values (e.g., for a product details page and/or a franchise page, separately) with the appropriate values for all of the data fields called for in the web application.

It is to be appreciated that this particular example code snippet shows just one example implementation of at least a portion of an API request and/or response schema for publishing licensed third-party content to one or more appropriate websites and/or web pages, and alternative implementations of the process can be used in other embodiments.

For example, in accordance with one or more embodiments, an awards and reviews syndication method can include webpage-level syndication, which can include processing awards and reviews data, carrying out at least one API call (e.g., via code snippet 300), and outputting at least a portion of the processed data onto at least one website UX (e.g., enterpriseX.com). Additionally or alternatively, an awards and reviews syndication method can include web part syndication, which can include processing awards and reviews data, carrying out at least one API call (e.g., via code snippet 300), using and/or implementing at least one web part backend, and outputting at least a portion of the processed data onto at least one website UX (e.g., enterpriseX.com). Accordingly, with respect to webpage-level syndication, in one or more embodiments, no additional configuration is required between the database and the web application(s) that generate the various UXs. Alternatively, in at least one embodiment, a secondary configuration can be implemented between the database and the web application using the query-based authoring module (i.e., web part) to designate the values to call for when the called values are not directly associated with the desired webpage to display the content.

One or more embodiments can additionally include universal cross-product object standardization, which can include, for example, implementing and/or utilizing website banners (e.g., with logos overlayed via API). Also, at least one embodiment includes automatically proliferating reviews and awards content to additional layers of the user/customer experience (e.g., beyond the initial layer associated with placement of the licensed third-party content).

By way merely of example, user experiences can be developed to implement content using the awards and reviews syndication techniques detailed herein, according to primary and secondary syndication strategies. By way of illustration, consider an example pertaining to primary website placements of licensed third-party content, which can be based at least in part on contextual placements of product reviews and/or awards on corresponding product details pages, which may also be shared with an appropriate product family or product category pages. In such an embodiment, UIs may include, for example, a paginating carousel or tiled row of content. Additionally, awards and reviews logos and/or pull-quotes, as well as product review videos may be displayed in separate modules and/or containers within a designated page zone. In such an embodiment, content can be displayed, for example, chronologically, showing the most recent, from left to right, based upon the publication date field of an awards and reviews file, limited by at least one set quantity control for each UI.

Further, in accordance with one or more embodiments, all legal guidelines and contractual obligations with publishers and/or venues from whom content is licensed, are met within primary web site placements.

Additionally, one or more embodiments include an awards carousel and product review video stream, which can more specifically include an API feed of featured awards and reviews (e.g., from industry expert publications), and an API feed of featured product review videos (e.g., from industry expert publications). Additionally or alternatively, at least one embodiment includes integrated component UI for primary placements. Such an embodiment can include an API feed of featured awards and reviews (e.g., from industry expert publications) and an API feed of featured product review videos (e.g., from industry expert publications).

By way of further illustration, consider an example pertaining to secondary website placements. In such an embodiment, featured placements of awards and reviews data in one or more additional webpage zones and/or website layers may include, for example, future-state UIs, utilizing only specific data fields as necessary, per design. To continue automation of at least one given data feed without any additional content setup, logic can be coded in the UI(s) to use the most recent available content, per publication date. This supports continuity in the UX when there may be multiple (e.g., primary and secondary) awards modules and/or UIs on a single template.

When used in a supplementary and/or complementary fashion with primary website placements, secondary website placements may be exempt from incorporating one or more elements as required in primary website placements. When intended as standalone components, secondary website placements can fulfill all publisher guidelines for display.

Displaying licensed third-party content, in accordance with one or more embodiments, can include multiple options and/or implementations. By way merely of example, featured award logos can be displayed in header sections of web pages (e.g., per logo image and taxonomy fields), featured product review videos can be displayed in header sections of web pages (e.g., per video+taxonomy fields), featured pull-quotes from product reviews can be displayed in various locations of web pages (e.g., per sub-headline and taxonomy fields), awards and reviews syndication can be extended to the shopping cart for associated awarded products e.g., (per product taxonomy fields), etc.

Figure 4:
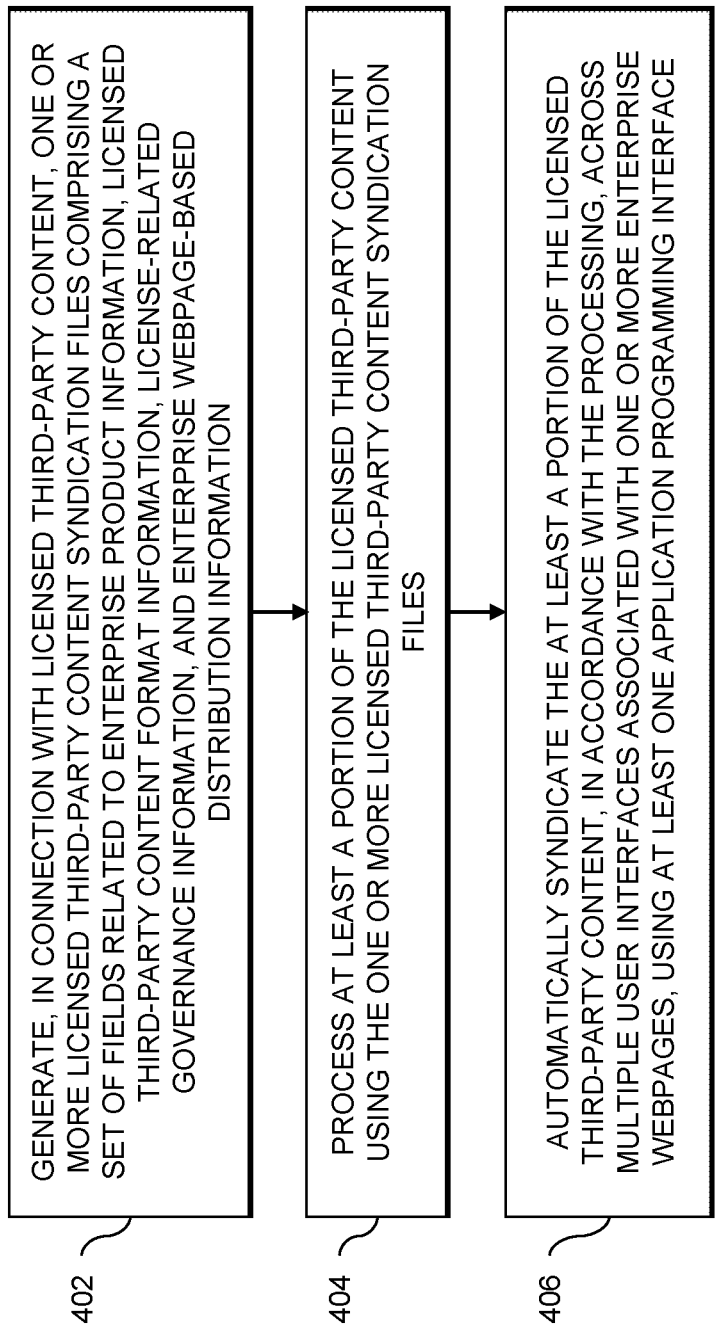
FIG. 4 is a flow diagram of a process for automatically syndicating licensed third-party content across enterprise webpages in an illustrative embodiment.

FIG. 4 is a flow diagram of a process for automatically syndicating licensed third-party content across enterprise webpages in an illustrative embodiment. It is to be understood that this particular process is only an example, and additional or alternative processes can be carried out in other embodiments.

In this embodiment, the process includes steps 402 through 406. These steps are assumed to be performed by the automated licensed third-party content syndication system 105 utilizing its elements 112, 114, 116 and 118.

Step 402 includes generating, in connection with licensed third-party content, one or more licensed third-party content syndication files comprising a set of fields related to enterprise product information, licensed third-party content format information, license-related governance information, and enterprise webpage-based distribution information. In one or more embodiments, the set of fields includes two or more of at least one control field for dynamic fields, one or more customer-facing content fields for text content, one or more customer-facing content fields for video content, one or more metadata fields for publishing licensed third-party content, and one or more fields for search engine optimization schemas. Also, at least one embodiment includes implementing one or more access control mechanisms with respect to entry of the licensed third-party content. In such an embodiment, entry of licensed third-party content is controlled and/or restricted to authorized individuals only via one or more access and/or permission-based protocols. Such protocols can, for example, ensure that only qualified and hygienic data, as detailed herein, are entered.

As also detailed herein, in at least one embodiment, the licensed third-party content includes one or more third-party video reviews of at least one enterprise product, one or more third-party text reviews of at least one enterprise product, and/or one or more third-party awards granted to at least one enterprise product.

Step 404 includes processing at least a portion of the licensed third-party content using the one or more licensed third-party content syndication files. Step 406 includes automatically syndicating the at least a portion of the licensed third-party content, in accordance with the processing, across multiple user interfaces associated with one or more enterprise webpages, using at least one application programming interface. In at least one embodiment, automatically syndicating the at least a portion of the licensed third-party content includes automatically syndicating multiple content formats, derived from the at least a portion of the licensed third-party content, across multiple user interfaces associated with one or more enterprise webpages. Additionally or alternatively, automatically syndicating the at least a portion of the licensed third-party content can include automatically syndicating based at least in part on one or more of multiple customer segments associated with one or more enterprise webpages, multiple geographic regions associated with one or more enterprise webpages, and multiple languages associated with one or more enterprise webpages.

Further, in at least one embodiment, automatically syndicating the at least a portion of the licensed third-party content using the at least one application programming interface includes precluding modification of the syndicated licensed third-party content outside of one or more display-related variation associated with the one or more enterprise webpages.

Also, in one or more embodiments, automatically syndicating the at least a portion of the licensed third-party content includes automatically displaying the at least a portion of the licensed third-party content in one or more designated areas of at least a portion of the multiple user interfaces associated with the one or more enterprise webpages. Additionally or alternatively, automatically syndicating the at least a portion of the licensed third-party content can include automatically syndicating based at least in part on one or more identifier values attributed to the one or more enterprise webpages and one or more identifier values attributed to one or more enterprise products. Further, automatically syndicating the at least a portion of the licensed third-party content can include automatically displaying the licensed third-party content in chronological order based on publication date.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically syndicate licensed third-party content across various enterprise websites and webpages. These and other embodiments can effectively overcome problems associated with resource-intensive and error-prone individual processes for managing and publishing varied content.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines.

The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
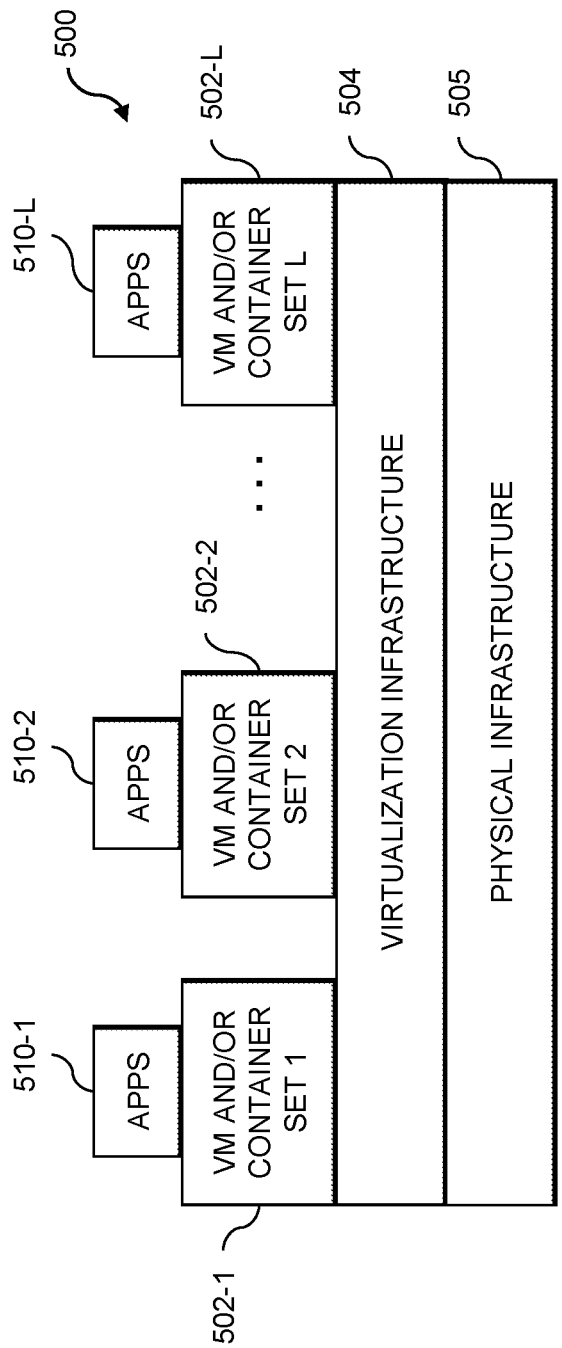
FIGS. 5 and 6 show examples of processing platforms that may be utilized to implement at least a portion of an information processing system in illustrative embodiments.
Figure 6:
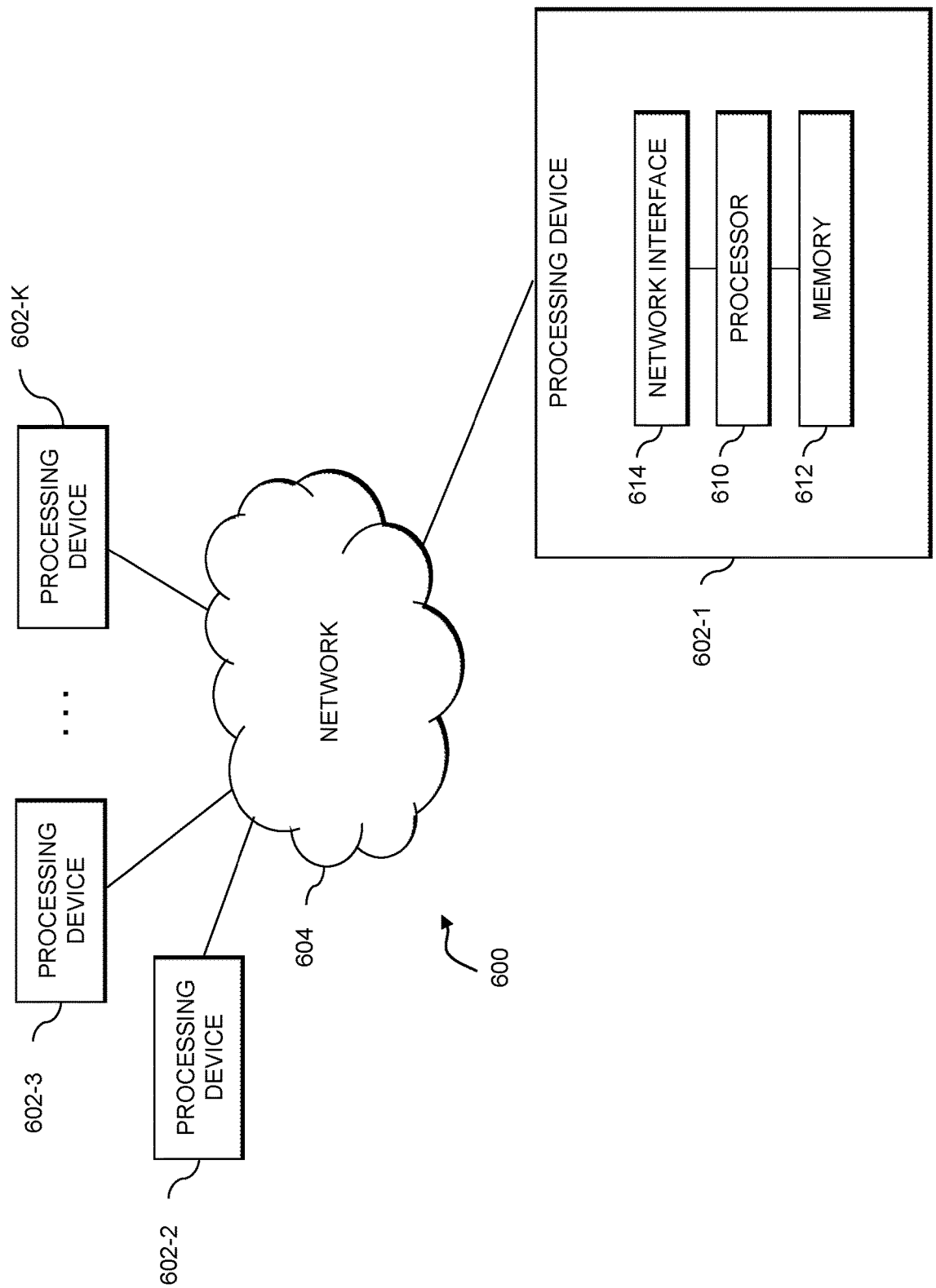

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
generating, in connection with licensed third-party content, one or more licensed third-party content syndication files comprising a set of fields related to enterprise product information, licensed third-party content format information, license-related governance information, and enterprise webpage-based distribution information;
processing at least a portion of the licensed third-party content using the one or more licensed third-party content syndication files;
automatically syndicating the at least a portion of the licensed third-party content, in accordance with the processing, across multiple user interfaces associated with one or more enterprise webpages, using at least one application programming interface; and
automatically displaying the at least a portion of the licensed third-party content in one or more designated areas of at least a portion of the multiple user interfaces associated with the one or more enterprise webpages;
wherein the method is performed by at least one processing device comprising a processor coupled to a memory.

2. The computer-implemented method of claim 1, wherein automatically syndicating the at least a portion of the licensed third-party content comprises automatically syndicating multiple content formats, derived from the at least a portion of the licensed third-party content, across multiple user interfaces associated with one or more enterprise webpages.

3. The computer-implemented method of claim 1, wherein automatically syndicating the at least a portion of the licensed third-party content comprises automatically syndicating based at least in part on one or more of multiple customer segments associated with one or more enterprise webpages, multiple geographic regions associated with one or more enterprise webpages, and multiple languages associated with one or more enterprise webpages.

4. The computer-implemented method of claim 1, wherein automatically syndicating the at least a portion of the licensed third-party content comprises automatically syndicating based at least in part on one or more identifier values attributed to the one or more enterprise webpages and one or more identifier values attributed to one or more enterprise products.

5. The computer-implemented method of claim 1, further comprising:
implementing one or more access control mechanisms with respect to entry of the licensed third-party content.

6. The computer-implemented method of claim 1, wherein automatically syndicating the at least a portion of the licensed third-party content using the at least one application programming interface comprises precluding modification of the syndicated licensed third-party content outside of one or more display-related variation associated with the one or more enterprise webpages.

7. The computer-implemented method of claim 1, wherein the set of fields comprises two or more of at least one control field for dynamic fields, one or more customer-facing content fields for text content, one or more customer-facing content fields for video content, one or more metadata fields for publishing licensed third-party content, and one or more fields for search engine optimization schemas.

8. The computer-implemented method of claim 1, wherein the licensed third-party content comprises at least one of one or more third-party video reviews of at least one enterprise product and one or more third-party text reviews of at least one enterprise product.

9. The computer-implemented method of claim 1, wherein the licensed third-party content comprises one or more third-party awards granted to at least one enterprise product.

10. A non-transitory processor-readable storage medium having stored therein program code of one or more software programs, wherein the program code when executed by at least one processing device causes the at least one processing device:
to generate, in connection with licensed third-party content, one or more licensed third-party content syndication files comprising a set of fields related to enterprise product information, licensed third-party content format information, license-related governance information, and enterprise webpage-based distribution information;
to process at least a portion of the licensed third-party content using the one or more licensed third-party content syndication files;
to automatically syndicate the at least a portion of the licensed third-party content, in accordance with the processing, across multiple user interfaces associated with one or more enterprise webpages, using at least one application programming interface; and
to automatically display the at least a portion of the licensed third-party content in one or more designated areas of at least a portion of the multiple user interfaces associated with the one or more enterprise webpages.

11. The non-transitory processor-readable storage medium of claim 10, wherein automatically syndicating the at least a portion of the licensed third-party content comprises automatically syndicating multiple content formats, derived from the at least a portion of the licensed third-party content, across multiple user interfaces associated with one or more enterprise webpages.

12. The non-transitory processor-readable storage medium of claim 10, wherein automatically syndicating the at least a portion of the licensed third-party content comprises automatically syndicating based at least in part on one or more of multiple customer segments associated with one or more enterprise webpages, multiple geographic regions associated with one or more enterprise webpages, and multiple languages associated with one or more enterprise webpages.

13. The non-transitory processor-readable storage medium of claim 10, wherein automatically syndicating the at least a portion of the licensed third-party content comprises automatically syndicating based at least in part on one or more identifier values attributed to the one or more enterprise webpages and one or more identifier values attributed to one or more enterprise products.

14. An apparatus comprising:
at least one processing device comprising a processor coupled to a memory;
the at least one processing device being configured:
to generate, in connection with licensed third-party content, one or more licensed third-party content syndication files comprising a set of fields related to enterprise product information, licensed third-party content format information, license-related governance information, and enterprise webpage-based distribution information;
to process at least a portion of the licensed third-party content using the one or more licensed third-party content syndication files;

to automatically syndicate the at least a portion of the licensed third-party content, in accordance with the processing, across multiple user interfaces associated with one or more enterprise webpages, using at least one application programming interface; and to automatically display the at least a portion of the licensed third-party content in one or more designated areas of at least a portion of the multiple user interfaces associated with the one or more enterprise webpages.

15. The apparatus of claim 14, wherein automatically syndicating the at least a portion of the licensed third-party content comprises automatically syndicating multiple content formats, derived from the at least a portion of the licensed third-party content, across multiple user interfaces associated with one or more enterprise webpages.

16. The apparatus of claim 14, wherein automatically syndicating the at least a portion of the licensed third-party content comprises automatically syndicating based at least in part on one or more of multiple customer segments associated with one or more enterprise webpages, multiple geographic regions associated with one or more enterprise webpages, and multiple languages associated with one or more enterprise webpages.

17. The apparatus of claim 14, wherein automatically syndicating the at least a portion of the licensed third-party content comprises automatically syndicating based at least in part on one or more identifier values attributed to the one or more enterprise webpages and one or more identifier values attributed to one or more enterprise products.

18. The apparatus of claim 14, wherein the set of fields comprises two or more of at least one control field for dynamic fields, one or more customer-facing content fields for text content, one or more customer-facing content fields for video content, one or more metadata fields for publishing licensed third-party content, and one or more fields for search engine optimization schemas.

19. The apparatus of claim 14, wherein the licensed third-party content comprises at least one of one or more third-party video reviews of at least one enterprise product and one or more third-party text reviews of at least one enterprise product.

20. The apparatus of claim 14, wherein the licensed third-party content comprises one or more third-party awards granted to at least one enterprise product.

\* \* \* \* \*